(12) United States Patent
Kuczynski et al.

(10) Patent No.: US 11,800,514 B2
(45) Date of Patent: Oct. 24, 2023

(54) CONFIGURATION FOR UPLINK SIGNALS OVER FRONTHAUL INTERFACE

(71) Applicant: NOKIA SOLUTIONS AND NETWORKS OY, Espoo (FI)

(72) Inventors: Sebastian Kuczynski, Wroclaw (PL); Frederic Bonneau, Versailles (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 25 days.

(21) Appl. No.: 17/215,277

(22) Filed: Mar. 29, 2021

(65) Prior Publication Data

US 2021/0314978 A1 Oct. 7, 2021

(30) Foreign Application Priority Data

Apr. 3, 2020 (FI) ..................................... 20205354

(51) Int. Cl.
*H04W 72/1268* (2023.01)
*H04B 7/06* (2006.01)
*H04L 5/00* (2006.01)

(52) U.S. Cl.
CPC ...... *H04W 72/1268* (2013.01); *H04B 7/0617* (2013.01); *H04L 5/0048* (2013.01)

(58) Field of Classification Search
CPC ............. H04W 72/1268; H04W 28/26; H04W 88/085; H04W 72/1289; H04W 72/0413; H04W 72/046; H04W 92/12; H04B 7/0617; H04L 5/0048
See application file for complete search history.

(56) References Cited

U.S. PATENT DOCUMENTS

| 2017/0163442 | A1* | 6/2017 | Shen | H04L 12/4633 |
| 2017/0223701 | A1 | 8/2017 | Bendle et al. | |
| 2018/0367289 | A1* | 12/2018 | Kim | H04L 5/0092 |
| 2019/0053319 | A1* | 2/2019 | Jeon | H04J 13/0062 |
| 2019/0289497 | A1* | 9/2019 | Rajagopal | H04L 25/0256 |
| 2020/0259629 | A1* | 8/2020 | Ovesjö | H04L 5/1438 |
| 2021/0126760 | A1* | 4/2021 | Lee | H04L 5/0005 |

(Continued)

OTHER PUBLICATIONS

U.S. Appl. No. 62/970,561, filed Feb. 5, 2020 (Year: 2020).*

(Continued)

*Primary Examiner* — Ian N Moore
*Assistant Examiner* — Sun Jong Kim
(74) *Attorney, Agent, or Firm* — SQUIRE PATTON BOGGS (US) LLP (57) ABSTRACT

Methods and devices for the configuration of uplink signals over fronthaul interfaces are provided. For example, a method can include receiving, in one or more fronthaul management plane messages instead of receiving in control plane messages, configuration information for scheduled uplink reception of periodic signals. The method can also include starting to use the received configuration information in the scheduled uplink reception in response to receiving a fronthaul management plane message activating a cell. The use of the received configuration information can be as if the configuration information for the uplink reception had been received in a control plane message. Receiving one or more of the periodic signals can be performed according to the corresponding scheduled uplink reception.

12 Claims, 3 Drawing Sheets

(56) References Cited

U.S. PATENT DOCUMENTS

2021/0243840 A1* 8/2021 Raghothaman ........ H04B 7/043
2022/0006509 A1* 1/2022 Shibata .............. H04B 7/15507
2022/0216959 A1* 7/2022 Teyeb ................... H04W 76/16

OTHER PUBLICATIONS

Extended European Search Report dated Sep. 8, 2021 corresponding to European Patent Application No. 21164448.9.
NGMN Alliance: "NGMN Overview on 5G RAN Functional Decomposition," 3GPP Draft; 180226 NGMN_RANFSX_D1_V20_FINAL, Apr. 8, 2018, XP051433613.

* cited by examiner

CONFIGURATION FOR UPLINK SIGNALS OVER FRONTHAUL INTERFACE

TECHNICAL FIELD

Various example embodiments relate to fronthaul wireless communications.

BACKGROUND

Wireless communication systems are under constant development. One example is a radio access network fronthaul architecture, in which multiple remote units, for example remote radio heads, are serviced by a single central unit, for example by a baseband unit. User data and control data are transmitted over a connection between a remote unit and the central unit. The control data may be used to communicate processing rules, including configuration information, for example beamforming configuration, which to apply in the remote unit for resource elements transmitted over the air.

BRIEF DESCRIPTION

The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to an aspect there is provided a radio unit comprising at least one processor; and at least one memory including computer program code, the at least one memory and computer program code configured to, with the at least one processor, cause the radio unit at least to perform: receiving in one or more fronthaul management plane messages configuration information for scheduled uplink reception of periodic signals; and starting to use the scheduled uplink reception in response to receiving a fronthaul management plane message activating a cell.

In an embodiment, the at least one memory and computer program code configured to, with the at least one processor, cause the radio unit further to perform: repeating the reception of a periodic signal according to a pattern length parameter aligned with a first frame and according to a parameter for signal occurrence relative to the start of a pattern; processing a received periodic uplink signal to one or more user plane messages; and causing sending the one or more user plane messages to a distributed unit.

In an embodiment, the at least one memory and computer program code configured to, with the at least one processor, cause the radio unit further to perform: using beamforming configuration received in the configuration information in the one or more fronthaul management plane messages; receiving beamforming configuration information in one or more fronthaul control plane messages; and updating the used beamforming configuration correspondingly.

In an embodiment, the at least one memory and computer program code configured to, with the at least one processor, cause the radio unit further to perform: receiving in the one or more fronthaul management plane messages configuration information for scheduled uplink reception of radio access channel signals and configuration information for scheduled uplink reception of raw sounding reference signals.

According to an aspect there is provided a n apparatus comprising at least one processor; and at least one memory including computer program code, the at least one memory and computer program code configured to, with the at least one processor, cause the apparatus at least to perform: causing sending from the apparatus one or more fronthaul management plane messages to one or more radio units, a fronthaul management plane message comprising configuration information for scheduled uplink reception of periodic signals by a radio unit.

In an embodiment, the at least one memory and computer program code configured to, with the at least one processor, cause the apparatus further to perform: determining for configuration information for a periodic signal one or more of the following parameters, which include a pattern length parameter aligned with a first frame, a parameter for signal occurrence relative to the start of a pattern, reception characteristics parameters defining time characteristics and frequency characteristics, parameters for guard tones, and parameters for user plane characteristics.

In an embodiment, the at least one memory and computer program code configured to, with the at least one processor, cause the apparatus further to perform: causing sending in the one or more fronthaul management plane messages beamforming configuration; and causing sending one or more in one or more fronthaul control plane messages beamforming configuration information to update previously sent beamforming configuration information.

In an embodiment, the at least one memory and computer program code configured to, with the at least one processor, cause the apparatus further to perform: causing sending in the one or more fronthaul management plane messages configuration information for scheduled uplink reception of radio access channel signals and configuration information for scheduled uplink reception of raw sounding reference signals.

According to an aspect there is provided a method for a radio unit, the method comprising: receiving in one or more fronthaul management plane messages configuration information for scheduled uplink reception of periodic signals; and starting to use the scheduled uplink reception in response to receiving a fronthaul management plane message activating a cell.

According to an aspect there is provided a method for an apparatus, the method comprising: causing sending from the apparatus one or more fronthaul management plane messages to one or more radio units, a fronthaul management plane message comprising configuration information for scheduled uplink reception of periodic signals by a radio unit.

According to an aspect there is provided a computer program comprising instructions which, when the program is executed by one or more processors, cause the one or more processors to carry out at least: configuring for uplink reception in response to receiving in one or more fronthaul management plane messages configuration information for scheduled uplink reception of periodic signals; and starting to use the scheduled uplink reception in response to receiving a fronthaul management plane message activating a cell.

According to an aspect there is provided a computer program comprising instructions which, when the program is executed by one or more processors, cause the one or more processors to carry out at least: causing sending from the apparatus one or more fronthaul management plane messages to one or more radio units, a fronthaul management plane message comprising configuration information for scheduled uplink reception of periodic signals by a radio unit.

According to an aspect there is provided a non-transitory computer-readable storage medium storing one or more instructions which, when executed by one or more processors, cause the one or more processors to carry out at least: configuring for uplink reception in response to receiving in one or more fronthaul management plane messages configuration information for scheduled uplink reception of periodic signals; and starting to use the scheduled uplink reception in response to receiving a fronthaul management plane message activating a cell.

According to an aspect there is provided a non-transitory computer-readable storage medium storing one or more instructions which, when executed by one or more processors, cause the one or more processors to carry out at least: causing sending from the apparatus one or more fronthaul management plane messages to one or more radio units, a fronthaul management plane message comprising configuration information for scheduled uplink reception of periodic signals by a radio unit.

According to an aspect there is provided a radio unit comprising means for performing: receiving in one or more fronthaul management plane messages configuration information for scheduled uplink reception of periodic signals; and starting to use the scheduled uplink reception in response to receiving a fronthaul management plane message activating a cell.

According to an aspect there is provided a n apparatus comprising means for performing: causing sending from the apparatus one or more fronthaul management plane messages to one or more radio units, a fronthaul management plane message comprising configuration information for scheduled uplink reception of periodic signals by a radio unit.

According to an aspect there is provided an electromagnetic signal for encoding information for fronthaul management plane data, the signal comprising configuration information for scheduled uplink reception of periodic signals by a radio unit.

In an embodiment, the electromagnetic signal comprises as configuration information for a periodic signal one or more of the following parameters, which include a pattern length parameter aligned with a first frame, a parameter for signal occurrence relative to the start of a pattern, reception characteristics parameters defining time characteristics and frequency characteristics, parameters for guard tones, and parameters for user plane characteristics.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
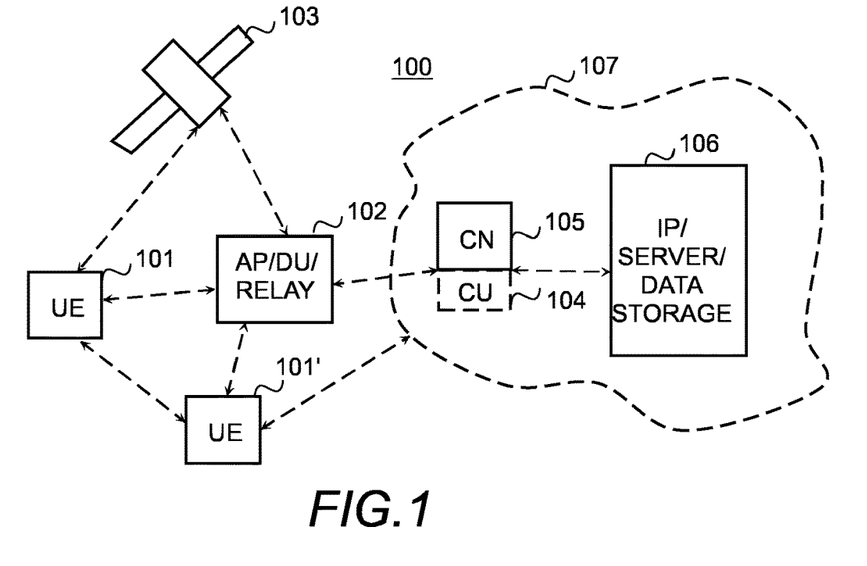
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment.

The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as relay nodes, for example distributed unit (DU) parts of one or more IAB nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
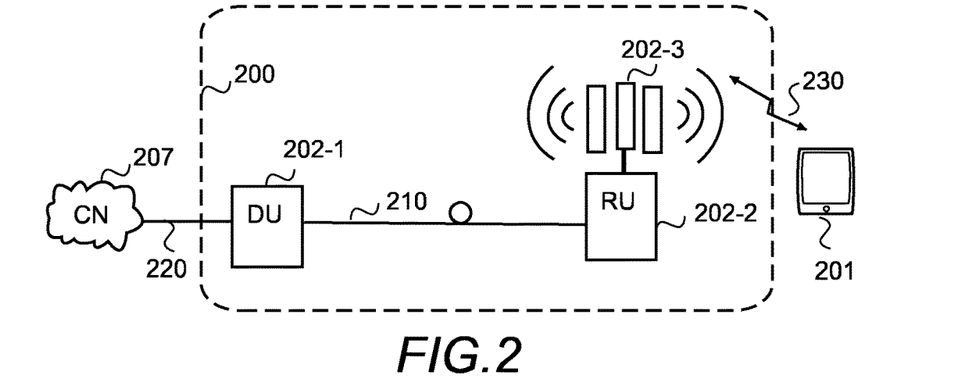
FIG. 2 illustrates an example of fronthaul architecture.

FIG. 2 illustrates a simplified example of a wireless system, which is configured to comprise a fronthaul radio access network 200. It should be appreciated that FIG. 2 only shows some apparatuses/units to illustrate the fronthaul radio access network 200. It is apparent to a person skilled in the art that the systems also comprise other equipment, functional entities and apparatuses, and any number of illustrated apparatuses/units.

In the fronthaul radio access network 200 base station functionalities are distributed between a distributed unit DU 202-1 and a radio unit RU 202-2. The distributed unit may be called a baseband unit and the radio unit may be called a remote radio head.

The distributed unit 202-1 and the one or more radio units 202-2 (only one illustrated in FIG. 2) of the distributed unit are connected with a connection 210. The connection 210 may be an optical fiber connection but any other types of connections, for example microwave, may be used as well. The distributed unit 202-1 is further connected over a connection 220 to a core network 205, or have backhaul connections towards the core network in a centralized radio access network architecture. The radio unit 202-2 comprises one or more radio antennas 202-3 via which wireless connections 230 to user devices 201 (user apparatuses, only one illustrated in FIG. 2) are established. The one or more radio antennas 202-3 form an array antenna.

The connection 210 between the distributed unit 202-1 and the radio unit 202-2 provides a fronthaul interface over which management plane messages (fronthaul management plane messages), control plane messages (fronthaul control plane messages) and user plane messages (fronthaul user plane messages) are transmitted, using, for example, a protocol currently being defined by O-RAN Alliance.

Figure 3:
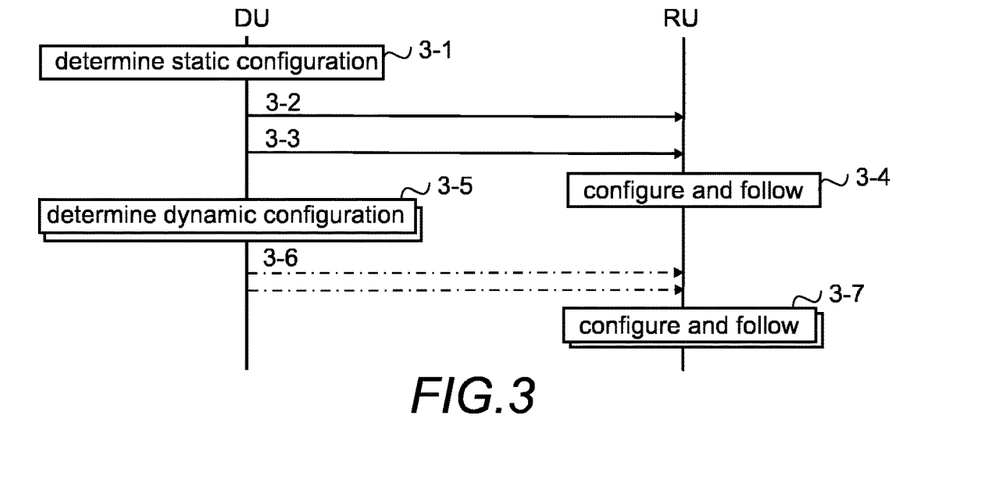
FIG. 3 illustrates an example of messaging configuration information.

FIG. 3 illustrates examples of messaging control information according to an example. In the illustrated example static configuration information, such as configuration information for scheduled uplink reception of periodic signals by a radio unit RU is determined by a distributed unit DU in block 3-1, and the configuration information is sent in one or more management plane messages 3-2 over the management plane. Further, in the illustrated example, the distributed unit D-U activates a cell by sending management plane message 3-3. Upon receiving the one or more management plane messages 3-2 the RU configures itself accordingly in block 3-4, and upon receiving message 3-3 starts to follow the configuration in block 3-4. Since the configuration was received in the management plane messages, the RU is configured to follow the configuration in block 3-4 as long as a new corresponding configuration is received. As can be seen, in the illustrated example the configuration process using management plane messages happens only once before cell activation.

In the illustrated example dynamic configuration information, i.e. information for uplink reception of signals that may vary from one slot to another, such as configuration for beamforming and reception, is determined by the distributed unit DU in block 3-5, and the configuration information is sent in one or more control plane messages 3-6 over the control plane. Upon receiving the one or more control plane messages 3-6 the RU configures itself accordingly in block 3-7 correspondingly and starts to follow the configuration in block 3-7 for a duration of one slot, until a new configuration is received. The recurrence of dynamic configuration information is depicted by the overlapped blocks 3-5, 3-7 and couple of messages 3-6 in FIG. 3.

Hence, using the management plane messages to convey configuration information for periodic uplink signals instead of repeatedly sending the same configuration information in control plane messages avoids periodic bursts of control plane messages. Furthermore, low-latency and strict real-time requirements on the distributed unit DU and on the radio unit RU relating to reception of periodic uplink signals are removed.

Figure 4:
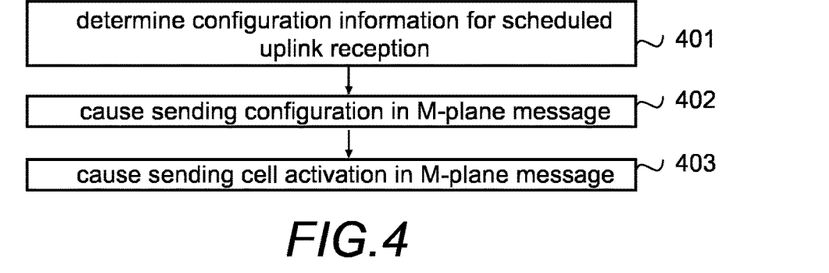
FIGS. 4 and 5 are flow charts illustrating different examples of functionalities of a distributed unit.

FIG. 4 is a flow chart illustrating an example functionality of the distributed unit. Referring to FIG. 4, a configuration information for scheduled uplink reception of periodic signals is determined in block 401. For example, the configuration may be determined for the physical radio access channel (PRACH) and for so-called raw sounding reference signals. A raw sounding reference signal is a sounding reference signal received separately from each array element of the array antenna without beamforming. Sending the configuration information using management plane messages is caused in block 402. Also sending management related information, for example cell configuration information, may be caused in block 402. Then, in the illustrated example, sending a cell activation in a management plane message is caused in block 403.

Figure 5:
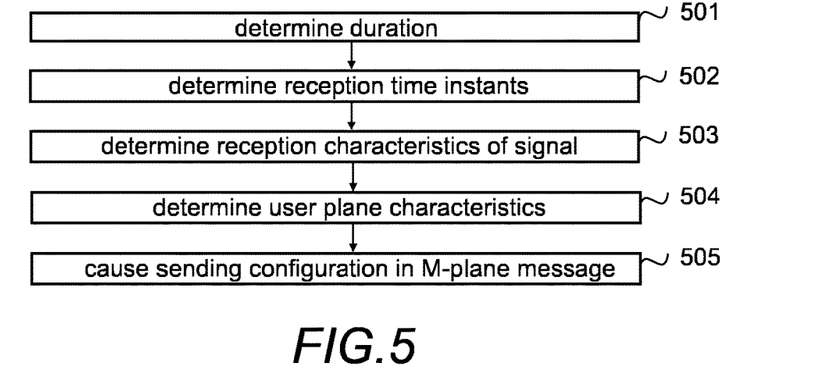

FIG. 5 illustrates an example of determining the configuration information for scheduled uplink reception of a periodic signal. The procedure may be repeated as many times as there are periodic signals, so that there is a scheduled uplink reception for each periodic signal. For example, the procedure is performed to the physical radio access channel and then to the raw sounding reference signal (or in a vice versa order).

Figure 6:
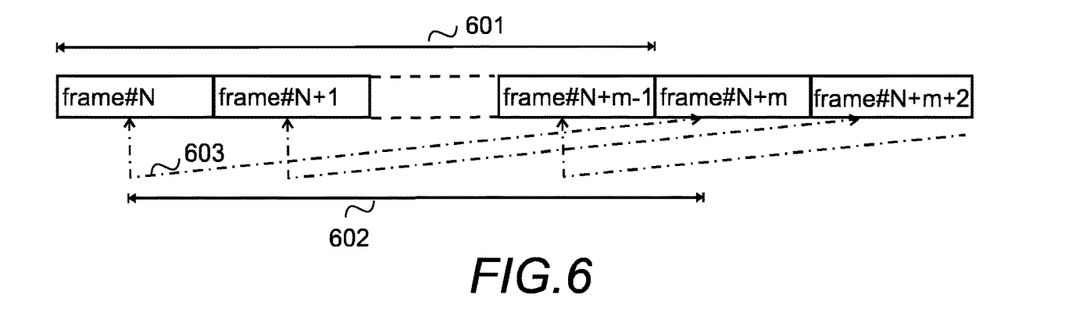
FIGS. 6 and 7 illustrates parameters.

Referring to FIG. 5, a configuration parameter called herein a duration is determined in block 501. The duration is a repeatable sequence of reception occurrences. The duration is expressed as a number of frames after which the sequence (reception occurrence) is repeated. In other words, a pattern is repeated in every $m^{th}$ frame, m being the value of the configuration parameter. FIG. 6 illustrates the duration parameter, duration of m frames being indicated by line 601 and line 602 indicating pattern length, i.e. pattern repetition (pattern repeated every m frames), line 603 indicating starting points of two consecutive reception occurrences. The duration parameter defining the line 602 may be called a pattern length parameter aligned with a first frame. For example, if frames are numbered 0-1023, and duration of one frame is 10 ms, the shortest duration may be 10 ms and the longest duration 10240 ms. As can be seen from FIG. 6, multiple reception occurrences per pattern may take place. If the periodic uplink signal uses a fixed duration, there is no need to determine a specific duration configuration parameter. For example, the raw sounding reference signal may use a fixed duration of one frame (10 ms).

Figure 7:
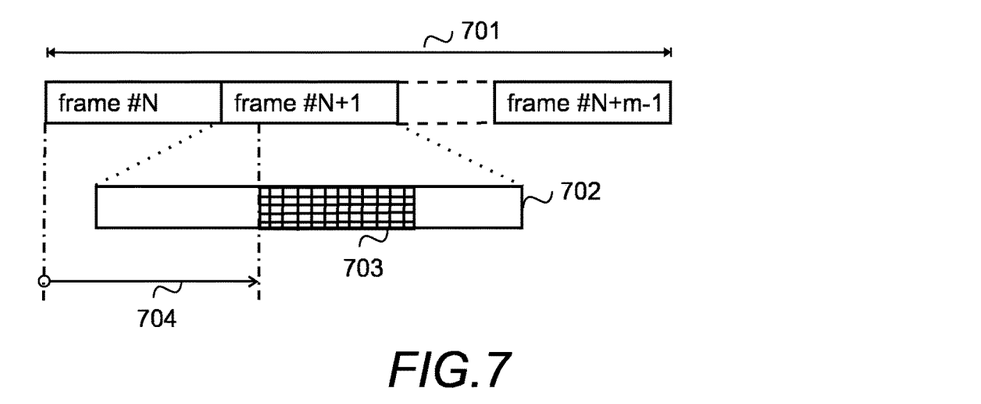

One or more parameters defining reception time instants are determined in block 502. A time instant may be a parameter that determines a time offset from a start of a duration of the m frames, to the beginning of the signal, illustrated in FIG. 7. Referring to FIG. 7, line 701 depicts the duration of m frames, and the periodic signal 703 is sent in frame 702, the time offset 704 being determined from the start of the duration, i.e. start of a pattern. The time offset 704 may be called a parameter for signal occurrence relative to the start of the pattern. It should be appreciated that even though FIG. 7 depicts, for the sake of clarity, only one time offset 704, there may be more than one time offset within one frame. The time instants may as well be determined using management plane parameters that correspond parameters used in control plane messages, such as a frame identifier, a subframe identifier, a slot identifier, a start symbol identifier, and a time offset.

Reception characteristics of a signal to be received, or more precisely reception characteristics parameters, are determined in block 503. The reception characteristics parameters define time characteristics of a signal and frequency characteristics of a signal. Examples of such reception characteristics, using terminology in control plane channel, include sub carrier spacing, frequency range at which reception is to occur, duration of a signal to be received, such as symbol length, number of symbols, cyclic prefix length, and beamforming configuration to be applied. The reception characteristics may as well be determined using management plane parameters that correspond parameters used in control plane messages. For example, a frame structure may be used to convey subcarrier spacing and Fast Fourier Transform (FFT) size, cp-length (cyclic prefix length), a number of physical resource blocks to receive, frequency-offset, beam identifier, etc. Further, it is possible to use parameters that do not exists in control plane messages. For example, additional parameters to convey information about a number of guard tones for a physical radio access channel, or whole spectrum for raw sounding reference signals, may be used.

Further, user plane characteristics, or more precisely parameters for user plane characteristics, are determined in block 505. More precisely, characteristics of the way the periodic signal is conveyed in user plane messages from the radio unit RU to the distributed unit DU. The user plane characteristics define, for example, information on a data format to be used and information for the radio unit RU to identify which user plane message streams is to be used for conveying the received periodic signal.

Once the configuration has been determined, causing sending the configuration in one or more management plane messages is caused in block 506.

It should be appreciated that the parameters may be named differently than in the above examples, and the parameter names used for the same purpose may be different in the management plane than in the control plane.

As can be seen from the above example, when management plane messages are used to send the configuration information, more channel-specific characteristics may be sent, thereby enabling further optimization in the radio unit RU.

A further advantage is that less processing capacity and memory resources are needed in the radio unit since control plane messages conveying the same configuration information need not to be processed. Further, section type 3 intended to be used in the control plane for the configuration information of the physical radio access channel is also used by mixed-numerology channels, Hence, it is not possible to distinguish the configuration information for the physical radio access channel from the other channels. However, the use of management plane for the configuration information of the physical radio access channel enables optimization in the radio unit by enabling a dedicated and optimized signal receiver, which is not common with the mixed-numerology channels. The same applies to the raw sounding reference signal, which is intended to use a common section type 1.

Figure 8:
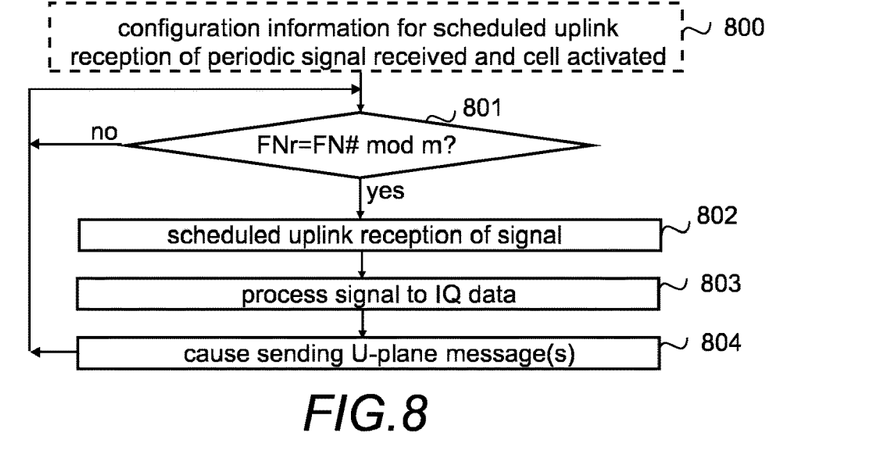
FIGS. 8 and 9 are flow charts illustrating different examples of functionalities of a radio unit.

FIG. 8 illustrates an example of a scheduled uplink reception of a periodic signal in the radio unit, after the configuration information for scheduled uplink reception of the periodic signal is received in one more management plane messages, after which the cell has been activated (block 800). In the illustrated example it is assumed that frames are numbered 0-1023 and the value of m is smaller than 1023. Therefore the current position in the pattern is calculated by shifting. For example, if pattern length m=8 and current frame number f=150, using the shifting, the current frame number for the purposes of signal reception is 6, because the sequence has been shifted 18 times (18*m=18*8=144) from the frame having number 0.

One way to implement the current position determination is to compare a scheduled reception frame number FNr to a relative frame number, which is obtained using modulo operation. In other words, the relative frame number is the result of FN # mod m, wherein FN # is the current frame number. In the example of FIG. 8 it is checked in block 801, whether the scheduled reception frame number FNr is the same as the result of FN # mod m. If it is, a scheduled uplink reception of the signal is taken place in block 802, as if the configuration information for the uplink reception had been received in a control plane message. The same applies to the further processing of the received signal. The received signal is processed in block 803 to IQ data (in phase and quadrature data), and sending the IQ data in one or more user plane messages to the distributed unit is caused in step 804. The process then continues to the current position determination in block 801.

As can be seen, the reception process is the same as a reception process when the configuration information is received in control plane messages, except that instead of receiving and processing the control plane messages, current position determination is performed to detect start of a frame based on which reception of uplink signal is configured.

If the pattern length is one (m=1), no current position determination is needed, the blocks 802 to 804 are simply repeated.

Figure 9:
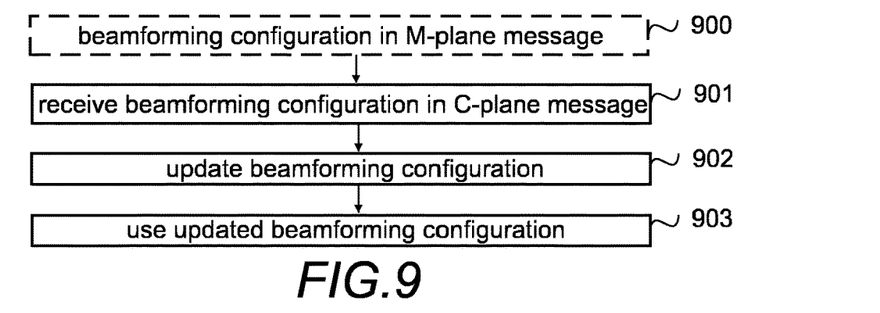

FIG. 9 illustrates an example of a hybrid beamforming configuration in the radio unit.

Referring to FIG. 9, the configuration information for scheduled uplink reception of the periodic signal is received in one or more management plane messages and the cell has been activated (block 900). The configuration information in the one or more management plane messages has comprised beamforming configuration. For example, beam identifier has been statistically allocated to the signal occasion, i.e. the occurrence of the signal in the time and frequency. The beam identifier identifies a beam weight vector, which is used for beamforming. In the illustrated example, the radio unit comprises one or more beam weight vectors.

Then the radio unit receives in block 901 beamforming configuration in a control plane message, updates in block 902 the beamforming configuration in the radio unit correspondingly and then uses in block 902 the updated beamforming configuration. Blocks 901 to 903 are repeated each time a control plane message comprising beamforming configuration is received.

The beamforming configuration may identify a beam identifier. That in turn updates the beam weight vector in use. The beamforming configuration may also update the beam weight vector.

The control plane messages comprising the beamforming configuration may be dedicated control plane messages or control plane messages used also for other channels/signals.

In a summary, configuration of specific user data channels is moved from the control plane (control plane interface) to the management plane (management plane interface). The set of parameters in the configuration information comprises a parameter for pattern length (pattern repeated every mai number of frames aligned with frame number zero), as illustrated in FIG. 6, aligned with a first frame, and a parameter defining the signal occurrence relative to the start of pattern, as illustrated in FIG. 7. Further, it is possible to define additional frequency-related parameters for channels/signals, such as the number of guard tone for the physical radio access channel or whole spectrum for the raw sounding reference signal. It also provides the static, or semi-static (hybrid) configuration of beamforming, as explained with FIG. 9.

The blocks, related functions, and information exchanges described above by means of FIGS. 2 to 9 are in no absolute chronological order, and some of them may be performed simultaneously or in an order differing from the given one. Other functions can also be executed between them or within them, and other information may be transmitted, and/or other rules applied or selected. Some of the blocks or part of the blocks or one or more pieces of information can also be left out or replaced by a corresponding block or part of the block or one or more pieces of information.

Figure 10:
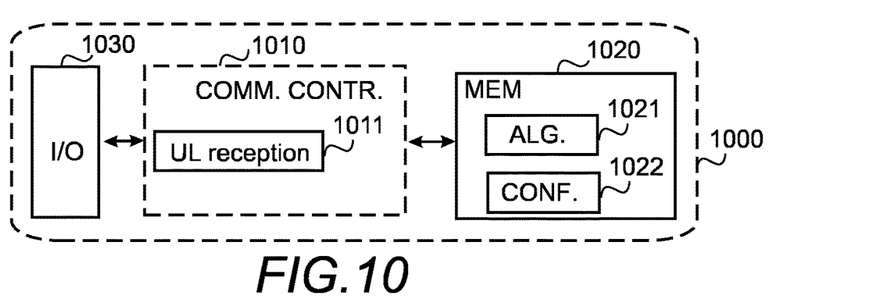
FIGS. 10 and 11 are schematic block diagrams.
Figure 11:
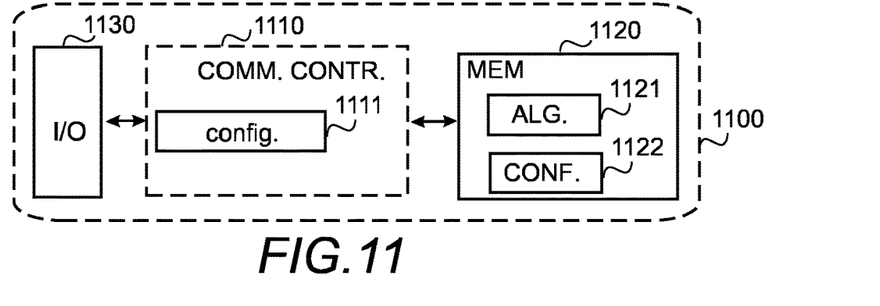

FIGS. 10 and 11 illustrate apparatuses comprising a communication controller 1010, 1110 such as at least one processor or processing circuitry, and at least one memory 1020, 1120 including a computer program code (software, algorithm) ALG. 1021, 1121, wherein the at least one memory and the computer program code (software, algorithm) are configured, with the at least one processor, to cause the respective apparatus to carry out any one of the embodiments, examples and implementations described above. FIG. 10 illustrates an apparatus for the radio unit, and FIG. 11 illustrates an apparatus for the distributed unit. The apparatuses of FIGS. 10 and 11 may be electronic devices.

Referring to FIGS. 10 and 11, the memory 1020, 1120 may be implemented using any suitable data storage technology, such as semiconductor based memory devices, flash memory, magnetic memory devices and systems, optical memory devices and systems, fixed memory and removable memory. The memory may comprise a configuration storage CONF. 1021, 1121, such as a configuration database, for at least storing one or more configurations, including control plane sections and/or corresponding parameters/parameter values. The memory 1021 may further store, at least temporarily, configuration information. The memory 1020, 1120 may further store a data buffer for data waiting to be processed (including transmission).

Referring to FIG. 10, the apparatus for the radio unit comprises a communication interface 1030 comprising hardware and/or software for realizing communication connectivity according to one or more radio communication protocols. The communication interface 1030 may provide the apparatus with communication capabilities to user devices (terminal devices) camping in one or more cells controlled by the distributed unit. In an embodiment, the communication interface may comprise one or more antenna arrays providing the apparatus with capability of forming directive transmission radio beams and the reception radio beams. The communication interface may comprise standard well-known components such as an amplifier, filter, frequency-converter, (de)modulator, and encoder/decoder circuitries and one or more antennas.

The communication controller 1010 comprises an uplink (UL) reception processing circuitry 1011 configured to receive periodic uplink signals. The uplink reception processing circuitry may, for example, configure the radio unit to perform uplink reception according to any one of the embodiments/examples/implementations described above. The communication controller 1010 may control the resource element processing circuitry 1011 to receive fronthaul management plane messages and to use them to determine scheduled uplink reception of periodic signals.

Referring to FIG. 11, the apparatus 1100 may further comprise a communication interface 1130 comprising hardware and/or software for realizing communication connectivity according to one or more radio communication protocols. The communication interface 1130 may provide the apparatus with communication capabilities with radio units and to the backhaul and/or core network. The communication interface may comprise standard well-known analog components such as an amplifier, filter, frequency-converter and circuitries, and conversion circuitries transforming signals between analog and digital domains. Digital signal processing regarding transmission and reception of signals may be performed in a communication controller 1110.

The communication controller 1110 comprises a configuration circuitry 1111 configured to create fronthaul management plane messages and control plane messages according to any one of the embodiments/examples/implementations described above. The configuration circuitry 1111 may communicate the configurations (configuration information) to the radio units through the communication interface 1130.

In an embodiment, at least some of the functionalities of the apparatus of FIG. 11 may be shared between two physically separate devices, forming one operational entity. Therefore, the apparatus may be seen to depict the operational entity comprising one or more physically separate devices for executing at least some of the processes described with respect to the distributed unit.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 9 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments comprises a circuitry including at least one processor and at least one memory including computer program code. When activated, the circuitry causes the apparatus to perform at least some of the functionalities according to any one of the embodiments/examples/implementations of FIGS. 2 to 9, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems (apparatuses) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 9 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A radio unit, comprising
at least one processor; and
at least one memory including computer program code, the computer program code configured to, when being executed by the at least one processor, cause the radio unit at least to perform:
receiving, in one or more fronthaul management plane messages instead of receiving in control plane messages, configuration information for scheduled uplink reception of periodic signals and activation information activating a cell;
starting to use the received configuration information in the scheduled uplink reception in response to receiving the fronthaul management plane message activating the cell, wherein the use of the received configuration information is as if the configuration information for the uplink reception had been received in a control plane message;
receiving one or more of the periodic signals according to the corresponding scheduled uplink reception; and
after activating the cell and using the received configuration information, receiving, in one or more fronthaul control plane messages, new configuration information, and updating the configuration information with the new configuration information and using the updated configuration information for scheduled uplink reception of periodic signals.

2. The radio unit according to claim 1, wherein the computer program code is further configured to, when being executed by the at least one processor, cause the radio unit at least to perform:
repeating reception of a periodic signal of the one or more of the periodic signals according to a pattern length parameter aligned with a first frame and according to a parameter for signal occurrence relative to a start of a pattern;
processing on a per-reception basis the received periodic signal to one or more user plane messages; and
causing sending the one or more user plane messages to a distributed unit.

3. The radio unit according to claim 1, wherein the computer program code is further configured to, when being executed by the at least one processor, cause the radio unit at least to perform:
using beamforming configuration received in the configuration information in the one or more fronthaul management plane messages;
receiving new beamforming configuration information in the new configuration information of the one or more fronthaul control plane messages; and
updating the used beamforming configuration correspondingly based on the received new beamforming configuration information.

4. The radio unit according to claim 1, wherein the configuration information for scheduled uplink reception of the periodic signals in one or more of the one or more fronthaul management plane messages is for scheduled uplink reception of radio access channel signals or for scheduled uplink reception of raw sounding reference signals.

5. An apparatus, comprising
at least one processor; and
at least one memory including computer program code, the computer program code configured to, when being executed by the at least one processor, cause the apparatus at least to perform:
causing sending from the apparatus to one or more radio units one or more fronthaul management plane messages comprising activation information activating a cell and configuration information for scheduled uplink reception of periodic signals by a corresponding radio unit of the one or more radio units instead of causing sending said configuration information in control plane messages; and
after the cell is activated, causing sending from the apparatus to the one or more radio units one or more fronthaul control plane messages comprising new configuration information to update the configuration information used by the one or more radio units with the new configuration information.

6. The apparatus according to claim 5, wherein the computer program code is further configured to, when being executed by the at least one processor, cause the apparatus at least to perform:
determining, for a periodic signal of the periodic signals, one or more of the following parameters: a pattern length parameter aligned with a first frame, a parameter for signal occurrence relative to a start of a pattern, reception characteristics parameters defining time characteristics and frequency characteristics, parameters for guard tones, and parameters for user plane characteristics.

7. The apparatus according to claim 5, wherein the computer program code is further configured to, when being executed by the at least one processor, cause the apparatus at least to perform:
causing sending, in the one or more fronthaul management plane messages, beamforming configuration; and
causing sending, in the one or more fronthaul control plane messages, new beamforming configuration information to update previously sent beamforming configuration.

8. The apparatus according to claim 5, wherein the computer program code is further configured to, when being executed by the at least one processor, cause the apparatus at least to perform:
causing sending, in the one or more fronthaul management plane messages, the configuration information for scheduled uplink reception of radio access channel signals and for scheduled uplink reception of raw sounding reference signals.

9. A method for a radio unit, the method comprising:
receiving, in one or more fronthaul management plane messages instead of receiving in control plane messages, configuration information for scheduled uplink reception of periodic signals and activation information activating a cell;
starting to use the received configuration information in the scheduled uplink reception in response to receiving the fronthaul management plane message activating the cell, wherein the use of the received configuration information is as if the configuration information for the uplink reception had been received in a control plane message;
receiving one or more of the periodic signals according to the corresponding scheduled uplink reception; and
after activating the cell and using the received configuration information, receiving, in one or more fronthaul control plane messages, new configuration information, and updating the configuration information with the new configuration information and using the updated configuration information for scheduled uplink reception of periodic signals.

10. The method for a radio unit according to claim 9, the method further comprising:
- repeating reception of a periodic signal according to a pattern length parameter aligned with a first frame and according to a parameter for signal occurrence relative to a start of a pattern;
- processing on a per-reception basis the received periodic signal to one or more user plane messages; and
- causing sending the one or more user plane messages to a distributed unit.

11. The method for a radio unit according to claim 9, the method further comprising:
- using beamforming configuration received in the configuration information in the one or more fronthaul management plane messages;
- receiving new beamforming configuration information in the new configuration information of the one or more fronthaul control plane messages; and
- updating the used beamforming configuration correspondingly based on the received new beamforming configuration information.

12. The method for a radio unit according to claim 9, wherein the configuration information for scheduled uplink reception of the periodic signals in one or more of the one or more fronthaul management plane messages is for scheduled uplink reception of radio access channel signals or for scheduled uplink reception of raw sounding reference signals.

* * * * *